Dec. 3, 1929.   J. STRZYCZKOWSKI   1,738,331
ROPE SPLICING DEVICE
Filed May 6, 1927
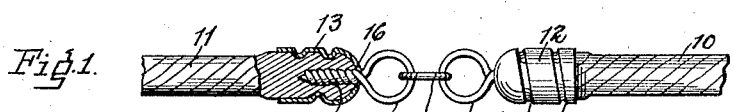
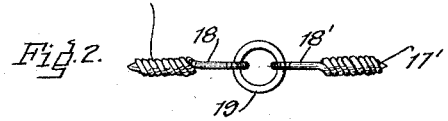
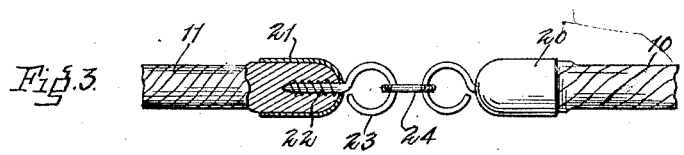
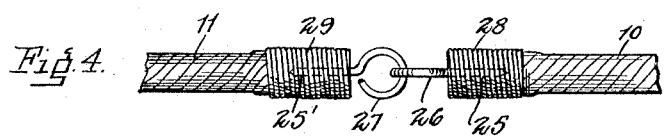
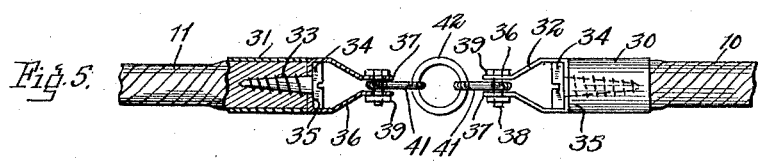
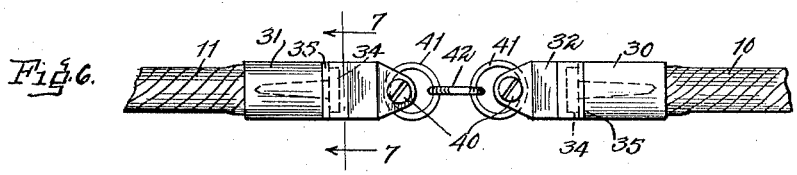
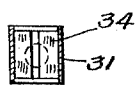
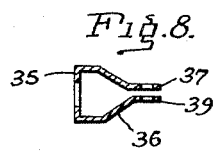
Inventor
Julian Strzyczkowski Patented Dec. 3, 1929

1,738,331

UNITED STATES PATENT OFFICE

JULIAN STRZYCZKOWSKI, OF NEW YORK, N. Y.

ROPE-SPLICING DEVICE

Application filed May 6, 1927. Serial No. 189,255.

This invention relates to a novel and improved rope splicing device, and it is the principal object of my invention to provide a simple and inexpensive device of this character permitting of a ready and convenient connection of two pieces of rope in order to either re-unite for instance the ends of a broken rope, or to add another length of rope to another rope.

Another object of my invention is the provision of a rope splicing device which is durable and apt to connect two rope ends firmly so that even a very strong pull exerted on the rope ends will not part the same.

A further object of my invention is the provision of a rope splicing device the members of which are adapted to readily be attached and firmly held on the ends of the ropes to be connected including means for connecting the member of the connection and for protecting the same against torsion.

These and other objects and advantages of my invention will become more fully known as the description thereof proceeds, and will then be specifically defined in the appended claims.

In the accompanying drawing:

Fig. 1 shows in plan view the ends of two ropes connected by a rope splicing device constructed according to my invention, one of the connecting members being shown in section in order to illustrate the interior arrangement.

Fig. 2 is a detail side view of the rope splicing screw and ring connection.

Fig. 3 is a view similar to Figure 1 of a modified form of rope splicing device.

Fig. 4 shows in plan view another modification of my rope splicing device.

Fig. 5 is a plan view of a still further modification.

Fig. 6 is a side elevation of the device Figure 5.

Fig. 7 is a section on line 7—7 of Figure 6.

Fig. 8 is a central longitudinal section of the end frame connection.

As illustrated in Figures 1 and 2, the rope ends 10 and 11 to be united by my novel and improved rope splicing device have attached thereto the metal caps 12 and 13 respectively adapted to be drawn over the rope ends and provided with the outer grooves 14, 15 forming inner ribs engaging the rope ends in order to give to the caps a firm hold on the rope ends. The caps have each an opening 16 in their oppositely disposed apexes through which the twisted ends 17, 17' of wires are inserted into the material of the rope ends in the direction of the longitudinal axes thereof in approximately the center of the rope bodies. At their outer ends the wires are formed into loops or eyes 18, 18' adapted to be united or connected by means of a wire ring 19 which may either be split or have the form of a key ring in order to facilitate the connection of the loops 18 and 18' or their separation, if desired, while they prevent accidental separation.

In the form of my rope splicer illustrated in Figure 3 the same consists of two approximately bell-shaped caps 20, 21 adapted to be drawn over the somewhat enlarged ends of the two ropes 10 and 11 to be connected. The enlargements at the ends of the ropes 10 and 11 may be made by untwisting the strands forming the ropes at their ends or in any other suitable manner. A pair of screws 22 are screwed into the rope ends in the direction of the longitudinal axes thereof and in approximately their middle, and their outer ends protruding from the material of the ropes are formed into eyes or rings 23 adapted to be united as described above with respect to the form illustrated in Figures 1 and 2, by a ring 24 or the like.

In the form of my invention illustrated in Figure 4, the rope ends 10 and 11 have screws 25, 25' embedded in approximately their center in the direction of their longitudinal axes the outer ends of which are formed into engaging loops or eyes 26, 27, preferably of the construction of rings 19 and 24 aforedescribed. These screws are firmly held within the rope ends by wires 28, 29 wound about the outer end faces of the rope ends tightly so as to prevent separation of the connecting members of the device.

In the modified form of my invention illustrated in Figures 5, 6 and 7, the splicer consists of the two metal caps 30, 31 tightly fitting and drawn over the rope ends 10 and 11 to be united, having their outer ends each formed into a frame 32 open on top and closed towards the sides as illustrated, the inner end bars of which are perforated for the passage of the screws 33 adapted to be firmly embedded into the material of the rope ends in the direction of their longitudinal axes and in approximately the center thereof, the outer heads of which screws are designated 34 and are square and rest against the outer faces of the end walls 35 of the frames. The outer, oppositely disposed ends of the frame have converging branches 36, and their extreme outer ends are straight and parallel to each other as at 37. Through aligned perforations in these straight ends of the frames bolts 38 are passed carrying at their outer ends the nuts 39, or these bolts may have the form of screws as indicated at 40 adapted to carry suitable nuts at their ends. Rings 41 are attached to the bolts or screws and held thereon in the frames, and the rings 41 of the frames on the ends of the ropes 10 and 11 are united by rings 42 of a construction aforedescribed.

The operation of my improved and novel rope splicer will be clearly understood from the above description and the simultaneous inspection of the drawing, the caps are drawn over the ends of ropes to be united or spliced and firmly held thereon by either the inner ribs formed by the outer grooves which embed themselves into the material of the rope and which will also firmly hold the screws therein, or the hold is effected by the outer wire tightly drawn and guided about the rope ends. Or, as in the form illustrated in Figures 5, 6 and 7, a kind of swivel joint is formed by the frames against the inner end plates of which rest the square heads of the screws. The outer rings at the ends of the screws are either connected directly with each other or by the intermediary of separate rings, which are either split or have the form of key-rings allowing a ready uniting of the members of the splicer or separation thereof if this is desired.

It will be understood that while I have disclosed as an example some of the many ways to practically construct my rope splicing device, I do not wish to limit myself to the exact constructions disclosed, but wish to reserve my right to make such changes in the general arrangement and in the construction of the specific details of my invention as come within the scope of the appended claims without departure from my invention as disclosed above.

Having thus described my invention, what I claim as new and desire to secure by Letters Patent is:

1. Rope splicer comprising a pair of screws, each adapted to be engaged in a rope end, caps having openings in their apexes for the passage of said screws, said caps adapted to be drawn over the ends of the ropes to be spliced and to be firmly held thereon, rings formed at the outer ends of said screws, and a ring for connecting the rings at the outer screw ends.

2. Rope splicer comprising caps adapted to be attached to the ends of ropes to be spliced, frames formed with said caps, means for connecting and holding said frames on said ends and forming a swivel connection between said caps and frames, rings held at the outer ends of said frames, and a ring connecting the end rings.

3. Rope splicer comprising caps adapted to be attached to the ends of two ropes to be united, screws having square heads adapted to be embedded into the rope ends, frames turnably held to said caps behind the heads of said screws, the front ends of said frames perforated, bolts passed through said perforations, rings held on said bolts, and a ring for connecting said rings.

4. Rope splicer comprising a pair of caps adapted to be engaged with and firmly held on the ends of two ropes to be spliced, a frame formed with each cap at one end thereof having a perforated end wall, a screw passing through the perforation in the end wall of each frame into the material of the rope end, a square head on said screw in front of said end wall forming a swivel connection between said frame and cap, the oppositely disposed ends of the frames perforated for the passage of screw bolts nuts on said screw bolts, rings on said screw bolts, and a ring uniting said rings and allowing a detaching thereof.

5. Rope splicer comprising a pair of frames, a pair of caps adapted to engage over the rope ends to be spliced, a swivel connection between said caps and frames, rings held on said frames, and a split or key ring connecting said rings.

Signed at New York, in the county of New York and State of New York this 26th day of April, A. D. 1927.

JULIAN STRZYCZKOWSKI.